United States Patent [19]
Miyazaki et al.

[11] Patent Number: 5,217,334
[45] Date of Patent: Jun. 8, 1993

[54] ANNULAR HOLE CUTTER

[75] Inventors: Osahiko Miyazaki; Kinya Nose, both of Tokyo, Japan

[73] Assignee: Nitto Kohki Co., Ltd., Japan

[21] Appl. No.: 748,280

[22] Filed: Aug. 21, 1991

[30] Foreign Application Priority Data

Aug. 22, 1990 [JP] Japan ................... 2-220797

[51] Int. Cl.⁵ .............................................. B23B 51/04
[52] U.S. Cl. ..................................... 408/206; 408/703
[58] Field of Search ......................... 408/206, 204, 703

[56] References Cited

U.S. PATENT DOCUMENTS

| | | | |
|---|---|---|---|
| 1,745,799 | 2/1930 | Carson et al. | 408/703 X |
| 3,765,789 | 10/1973 | Hougen | 408/204 |
| 4,322,187 | 3/1982 | Hougen | 408/204 |
| 4,500,234 | 2/1985 | Orth et al. | 408/703 X |
| 4,573,838 | 3/1986 | Omi et al. | 408/204 |
| 4,586,857 | 5/1986 | Ohmi | 408/703 X |
| 4,632,610 | 12/1986 | Hougen | 408/703 X |
| 4,758,120 | 7/1988 | Bijl | 408/204 |

FOREIGN PATENT DOCUMENTS

| | | | |
|---|---|---|---|
| 2910299 | 9/1980 | Fed. Rep. of Germany | 408/703 |
| 51-27511 | 8/1976 | Japan . | |
| 211408 | 12/1982 | Japan | 408/204 |
| 593622 | 10/1947 | United Kingdom | 408/204 |
| 1300773 | 12/1972 | United Kingdom . | |
| 0333651 | 9/1989 | United Kingdom . | |

Primary Examiner—Daniel W. Howell
Attorney, Agent, or Firm—Venable, Baetjer and Howard

[57] ABSTRACT

An annular hole cutter has a radially inner cutting tooth portion and a radially outer cutting tooth portion. Each of the inner and outer cutting tooth portions is formed with a flute for ejecting cut chips on the outer periphery of the cutter, and a cutting edge for radially outwardly pushing the cut chips. Therefore, the cut chips are smoothly ejected through the flute, and thus an annular hole is precisely cut at high speed.

8 Claims, 2 Drawing Sheets

ANNULAR HOLE CUTTER

BACKGROUND OF THE INVENTION

1. Field of the Invention

The present invention relates to an annular hole cutter.

2. Description of the Related Art

An annular hole cutter disclosed in Japanese Patent No. 51-27511 has a plurality of circumferentially spaced teeth on a ring-shaped transverse cross-section at its lower end, and each of the teeth is formed with a plurality of cutting edges. A chip formed by each cutting edge is divided into narrow pieces in the direction of the width of the chip and ejected through a single flute.

In such a conventional annular hole cutter, since two to four chips cut by one tooth are ejected through a single flute, even if a chip is divided into strips in cutting, the strips join in the flute when ejected. Therefore, the cut strips interfere with one another and are formed into powders, thereby stopping the flute up. As a result, the powders are fixed and adhered to the leading edge and/or the outer periphery of the cutter, and sometimes make cutting impossible. Therefore, it is necessary to perform cutting while preventing the cut powders from being fixed to the cutter by reducing the cutting velocity.

As described above, this kind of annular hole cutter has difficulties in efficiently ejecting chips cut by cutting edges with the increased cutting velocity.

SUMMARY OF THE INVENTION

The present invention aims to eliminate the above disadvantages of the prior art, and an object of the present invention is to provide an annular hole cutter capable of continuously and efficiently ejecting cut chips.

Another object of the present invention is to provide an annular cutter capable of easily ejecting cut chips which are cut by radially inward and outward cutting edges of the annular hole cutter, outwardly in the radial direction.

A further object of the present invention is to provide an annular hole cutter capable of achieving high-speed and high-precision cutting by enhancing ejection efficiency of cut chips.

In order to achieve the above objects, an annular hole cutter of the present invention comprises a main tubular body for rotating on its axis and having a ring-shaped transverse cross-section and cutting tooth groups circumferentially arranged in groups at the open end of the main tubular body. Each cutting tooth group is composed of a radially inner cutting tooth portion, and a radially outer cutting tooth portion circumferentially shifted from the inner cutting tooth portion. The inner and outer cutting tooth portions each have a gullet for forming a cutting edge, and a trailing face of the gullet in the direction of rotation is continuously connected to a trailing face of a flute which ejects cut chips and is formed around the outer periphery of the main tubular body with a spiral lead face extending upward and rearward in the direction of rotation. The radial width of a cutting zone including the cutting edge of the inner cutting tooth portion is at least less than the width of a cutting zone including the cutting edge of the outer cutting tooth portion, cutting points of the inner and outer cutting tooth portions formed on the trailing faces of the gullets in the direction of rotation are located radially outwardly from the centers of the widths of the respective cutting zones, and the cutting edges extending radially inwardly from the cutting points are longer than the cutting edges extending radially outwardly from the cutting points.

Furthermore, the annular hole cutter of the present invention is integrally formed, the depth of the flute is less than a half of the thickness of the main tubular body, and a crest extending upward and rearward from the cutting point in the direction of rotation. At least the cutting point of the inner cutting tooth portion is located on a plane perpendicular to the axis of the main tubular body, a land is formed between the flutes disposed around the outer periphery of the main tubular body, a projection protruding radially outwardly from the land and having a smaller width than that of the land is formed, and the number of the cutting tooth groups is at least two.

In the annular hole cutter of the present invention, a plurality of cutting tooth groups circumferentially formed at the leading end of the main tubular body each has a radially inner cutting tooth portion and a radially outer cutting tooth portion, the inner and outer cutting tooth portions have respective flutes for ejecting cut chips, and cutting edges disposed radially inwardly from the cutting points in the inner and outer cutting tooth portions are longer than the radially outward cutting edges. Therefore, the width of chips cut by the radially inward cutting edges in the inner and outer cutting tooth portions is greater than that of chips cut by the radially outward cutting edges, and thus the wider cut chips push the narrower cut chips radially outwardly and both cut chips are ejected through respective flutes. In other words, since the chips cut by the radially inward cutting edges of the inward and outer cutting tooth portions are wide, thus difficult to be broken and still kept in the shape of strings, these cut chips are continuously ejected radially outward and upward through the flutes while taking the chips cut by the radially outward cutting edges in the inner and outer cutting tooth portions.

As described above, since the annular hole cutter of the present invention can continuously eject cut chips, it is possible to achieve high-speed cutting and thus to precisely cut an annular hole at high speed.

BRIEF DESCRIPTION OF THE DRAWINGS

The accompanying drawings each show an embodiment of a rotary cutter according to the present invention.

DETAILED DESCRIPTION OF THE PREFERRED EMBODIMENTS

Figure 2:
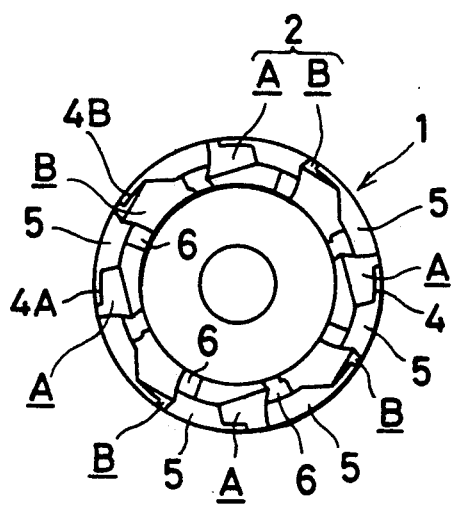
FIG. 2 is a front view of the rotary cutter.

An embodiment of an annular hole cutter according to the present invention shown in FIG. 2 includes four tooth groups 2. Each of the tooth groups 2 has a cutting tooth portions A and B, as hereinafter explained, which are arranged regularly and circumferentially at the open end of a main tubular body 1 having a ring-shaped transverse cross-section. It is preferable that the number of the tooth groups be at least two, especially, an odd number.

Figure 1:
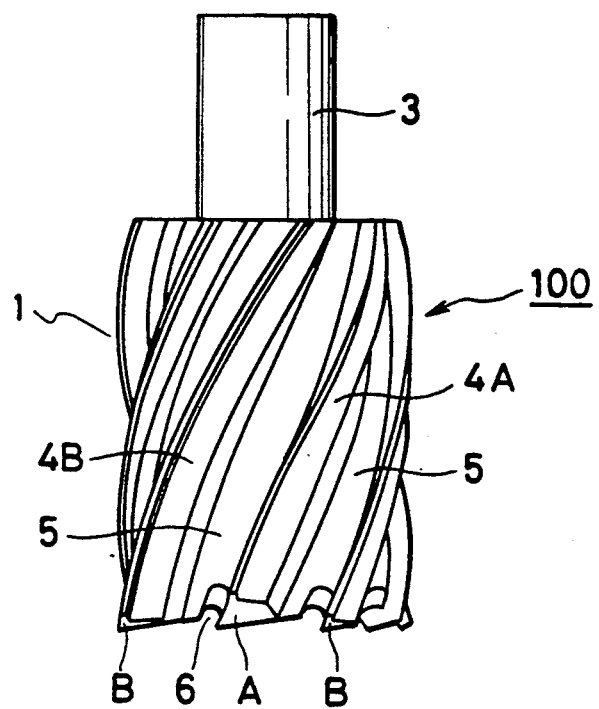
FIG. 1 is a side view of the rotary cutter.

Referring to FIG. 1, the integral annular hole cutter is constituted by a shank portion 3 which is directly or indirectly clamped by a rotary spindle of a boring machine and fixed to the center of rotation of the main tubular member 1, lands 4 spirally projecting on the outer periphery of the main tubular member 1, flutes 5 formed between the lands 4 and 4 so as to eject cut chips, and gullets 6 which eject the cut chips, are axially formed at the end face of the opening of the main tubular body 1 and constitute the end face of the opening and cutting edges. The annular hole cutter in this embodiment is similar to the prior art in that the gullets 6 and the flutes 5 are connected on the end face of the opening of the main tubular body 1. Explaining the flute 5 in detail, the depth, that is, the radial width of the flute 5 is equal to or less than a half of the thickness of the main tubular body 1.

The structures of the inner cutting tooth portion A and the outer cutting tooth portion B will now be described in detail, and the relationship between the tooth portions A and B and the flute 5 will be also described in detail.

Figure 8:
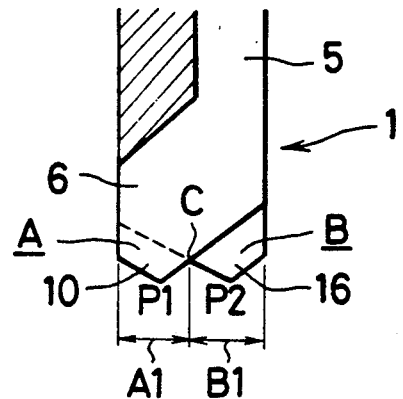
FIG. 8 is an explanatory view showing the inner cutting tooth portion A and the outer cutting tooth portion B disposed one on top of the other in front an back directions.

As shown in FIG. 8, the inner cutting tooth portion A is formed radially inwardly on the end face of the main tubular body 1, and an effective tooth width A1 of the inner cutting tooth portion A is set so as to be slightly shorter than an effective tooth width B1 of the cutting tooth portion B formed radially outwardly on the end face and equal to or slightly less than the depth of the flute 5. A cutting point P of the inner tooth portion A is located in a position which radially and outwardly shifts a little from the center of the effective tooth width A1. A crest 7 linearly extending from the cutting point P1 to a point disposed rearward in the direction of rotation of the main tubular body 1 intersects a virtual line L1 linking an axis P, that is, the axial line of the main tubular body 1 and the cutting point P1 at a right angle or at a slightly obtuse angle. The bottom face of the inner cutting tooth portion A which is divided into inner and outer parts by the crest 7 is formed with a radially inner back-off face 8 and a radially outer back-off face 9 which inclines at slightly greater angle than that of the back-off face 8 (see FIG. 3).

Figure 4:
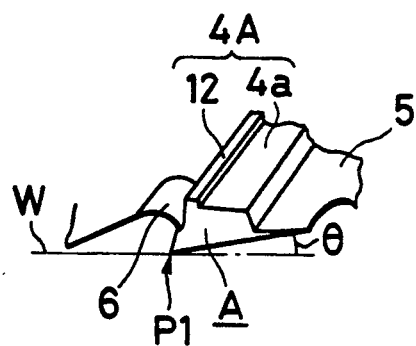
FIG. 4 is an enlarged perspective view of the inner cutting tooth portion A.
Figure 5:
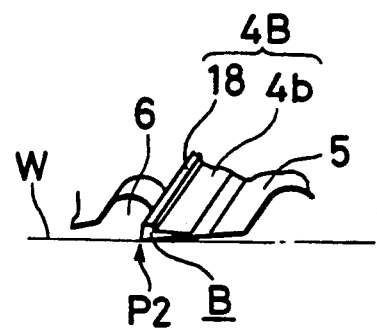
FIG. 5 is an enlarged perspective view of the outer cutting tooth portion B.

The crest 7 inclines upward at a slight angle $\theta$ so that the more rearward portion of the crest 7 in the direction of rotation of the annular hole cutter is disposed in the lower position from the cutting point P1, that is, so that the crest 7 gradually and linearly separates from the surface W of an object to be processed (see FIG. 4).

Figure 3:
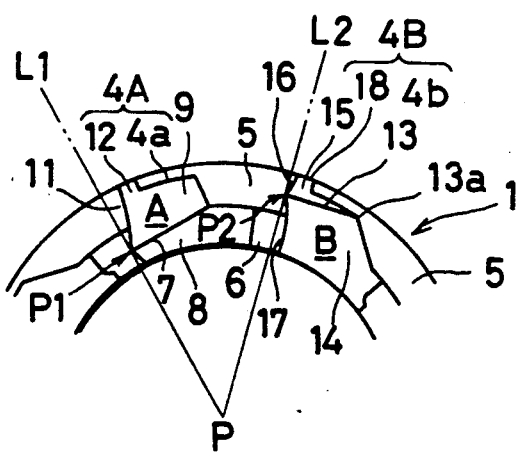
FIG. 3 is an enlarged front view of a tooth group composed of an inner cutting tooth portion A and an outer cutting tooth portion B.
Figure 6:
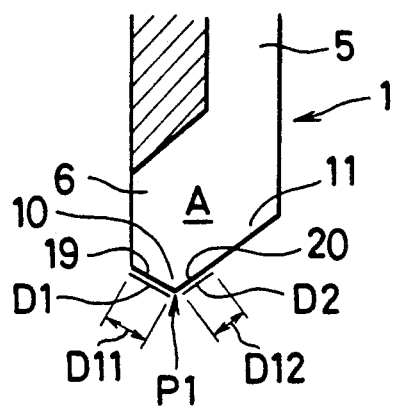
FIG. 6 is an enlarged explanatory view of the inner cutting tooth portion A.
Figure 7:
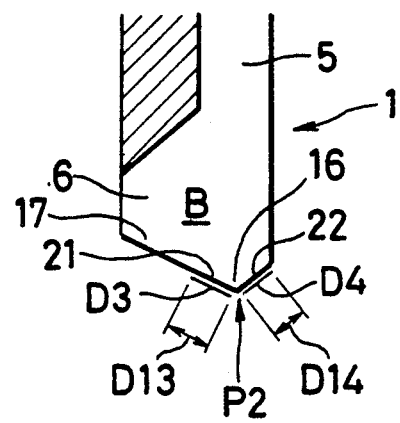
FIG. 7 is an enlarged explanatory view of the outer cutting tooth portion B.

A front portion of the inner cutting tooth portion A, that is, a cutting face 10 having the effective tooth width A1, as shown in FIG. 3, protrudes in the shape of an obtuse triangle so that the cutting point P is directed forward in the direction of rotation of the annular hole cutter, and constitutes a part of the gullet 6 while being continuously connected to the trailing face of the gullet 6 in the direction of rotation. As shown in FIG. 6, a non-cutting face 11 formed adjacent to the outer portion of the cutting face 10 is connected to the trailing face of the flute 5 in the direction of rotation.

The outer peripheral surface of a narrow projection 12 adjacent to the non-cutting face 11 substantially constitutes the outermost peripheral surface of the annular hole cutter, and a two-thirds or three-quarters portion 4' in width of the outer peripheral surface of the land 4 which is concentric with the outermost peripheral surface of the annular hole cutter is radially inwardly dented so as not to be in contact with a processed face of the object to be processed during the rotation of the annular hole. Since the outer peripheral surface is in no contact with the processed face, the frictional resistance between the annular hole cutter and the object to be processed is minimized.

A cutting point P2 of the outer tooth portion B is located in a position radially and outwardly shifted slightly from the center of an effective tooth width B1 which is slightly longer than the depth of the flute 5. A crest 13 extending linearly and rearwardly in the direction of rotation of the main tubular body 1 from the cutting point P2 intersects a virtual line L2 linking the axis P of the main tubular body 1 and the cutting point P2 at a right angle or at a slightly obtuse angle, and reaches a trailing ridge portion 13' of the land 4.

As shown in FIG. 3, the bottom face of the outer cutting tooth portion B which is divided into inner and outer parts by the crest 13 is formed with a radially inner back-off face 14 and a radially outer back-off face 15 which inclines at slightly greater angle than that of the back-off face 14. The back-off face 9 of the inner cutting tooth portion A and the back-off face 14 of the outer cutting tooth portion B almost intersect on a virtual boundary line C between the effective tooth widths A1 and B1 (see FIG. 8).

The crest 13 is similar to the crest 7 of the inner cutting tooth portion A in that the crest 13 inclines so that the more rearward portion of the crest 13 in the direction of rotation of the annular hole cutter is disposed in the lower position from the cutting point P2. However, a cutting face 16 and a non-cutting face 17 of the outer cutting tooth portion B are serially formed with the trailing face of the gullet 6 in the direction of rotation, and the trailing face of the gullet 6 is continuously connected to the trailing face of the flute 5 in the direction of rotation. The outer peripheral surface of a projection 18, which is formed adjacent to the radially outward portion of the cutting face 16 and has a narrow width the same as the projection 12, substantially forms the outermost peripheral surface of the annular hole cutter the same as the projection 12, and projects outward from the outer peripheral surface of the land 4, thereby minimizing the frictional resistance between the annular hole cutter and the object to be processed.

The cutting points P1 and P2 of the inner cutting tooth portion A and the outer cutting tooth portion B are located on planes perpendicular to the axis of the main tubular body 1, respectively, and the planes may be a common plane. Therefore, the inner cutting tooth portion A and/or the outer cutting tooth portion B are simultaneously brought into contact with the surface W of the object to be processed in a cutting operation, and cutting is simultaneously executed by cutting edges 19 and 20 and/or 21 and 22 formed on intersection lines of the cutting plane 10 (16) including the cutting point P1 (P2) and the back-off faces 8 and 9 (14 and 15). The relationships between the widths D11 and D12 of cut chips D1 and D2 cut by the cutting edges 19 and 21 and the widths D13 and D14 of cut chips D3 and D4 cut by the cutting edges 21 and 22 are D11>D12 and D13>D14.

Operations of the above embodiment will now be described.

The annular hole cutter is fixed to a rotatable spindle of a boring machine through an arbor, the boring machine is fixed onto the surface of an object to be processed, and the spindle is rotated. When the annular hole cutter is moved toward the object while being rotated, the inner cutting tooth portions A and the outer cutting tooth portions B alternatively arranged on the open end of the annular hole cutter are simultaneously or sequentially brought into contact with the surface W of the object.

In the above operation, the cutting point P1 of the inner cutting tooth portion A and the cutting point P2 of the outer cutting tooth portion B on the surface W of the object maximize the outer diameter of the annular cutter due to the cutting edges 19 and 20 on both sides of the cutting point P1 and the cutting edges 21 and 22 on both sides of the cutting point P2, cutting by the thickness of the main tubular body 1 is carried on, and the object is annularly cut.

In the inner cutting tooth portion A, chips D1 and D2 cut by the cutting edges 19 and 20 forming the effective tooth portion A1 reach above the main tubular body 1 through the gullet 6 and the flute 5 which open adjacent to each other in the front portion, and are ejected. Since the width D11 of the chip D1 cut by the radially inward cutting edge 19 is greater than the width D12 of the chip D2 cut by the radially outward cutting edge 20, the mass and rigidity of the wider chip D1 are greater than those of the narrower chip D2, and the chip D1 pushes out the chip D2 radially outwardly, that is, from the gullet 5 toward the flute 5. In particular, the chips cut in the inner cutting tooth portion A whose gullet is likely to be stopped up are smoothly ejected from the flute 5.

On the other hand, in the outer cutting tooth portion B, chips D3 and D4 cut by the cutting edges 21 and 22 are ejected from another flute 5 to above the main tubular body 1 through another gullet 6.

Cutting by the effective tooth portion B1 of the outer cutting tooth portion B is conducted by the rest of the width of the cutting zone by the effective tooth portion A1 of the inner cutting tooth portion A. Since the width D13 of the chip D3 cut by the radially inward cutting edge 21 is greater than the width D14 of the chip D4 cut by the radially outward cutting edge 22, the mass and rigidity of the wider chip D3 are greater than those of the narrower chip D4. Even if the chip D3 tries to move toward the gullet 6, an action for preventing the movement arises. The chips D3 and D4 cut by the cutting operation of the outer cutting tooth portion B are smoothly ejected from another flute 5 separately from the chips D1 and D2.

When the object is thus cut by the cutting edges 19, 20, 21 and 22, since the cut chips D1 and D2 and the cut chips D3 and D4, each having a width equal to the thickness of the main tubular body 1, are ejected from different gullets 6 and flutes 5, the cutting operation is smoothly carried on without increasing the cutting resistance. When the annular cutting is completed, a cylindrical slag formed by the annular cutting separates and falls from the object, and an annular hole having a diameter corresponding to the outer diameter of the outer cutting tooth portion B, that is, the outer diameter of the annular hole cutter, is formed.

According to the annular hole cutter of the present invention, since the depth of the flute 5 can be equal to or less than a half of the thickness of the main tubular body 1, the rigidity of the cutter is sufficient. Furthermore, the width of the cutting zone of the effective tooth portion A1 formed by the cutting edges 19 and 20 of the inner cutting tooth portion A is almost equal to or slightly less than the depth of the flute 5, and the cutter has such an indented structure that the chips cut by the cutting edge 19 inside the cutting point P1 and the cutting edge 21 inside the cutting point P2 smoothly move toward the flute. Therefore, the cutter is prevented from being stopped up due to cut chips, and a precise cutting operation can be extremely smoothly carried out.

In particular, as shown in the above embodiment, since the present invention ejects the chips cut by the inner cutting tooth portion A and the chips cut by the outer cutting tooth portion B from different flutes in relation to the structure of the inner and outer cutting tooth portions A and B, that is, an indented structure, the ejection of the cut chips can be smoothly performed without reducing the cutting velocity. Therefore, it is possible to remarkably enhance the cutting efficiency compared with the conventional annular hole cutter.

What is claimed is:

1. An annular hole cutter, comprising:
   a main tubular body adapted to be rotated about an axis thereof, said main tubular body having a ring-shaped transverse cross-section, an open end, and a plurality of flutes formed therein for ejecting cut chips, each said flute having a spiral lead face that extends upwardly and rearwardly from said open end in the direction of rotation of the main tubular body; and
   a plurality of cutting teeth circumferentially arranged in cutting tooth groups at said open end of said main tubular body, each said cutting tooth group comprising a radially inner cutting tooth portion and a radially outer cutting tooth portion;
   wherein said inner and outer cutting tooth portions each has a gullet formed therein, each said gullet having a trailing face in the direction of rotation of said main tubular body, that has a cutting edge and cutting point at said open end of said main tubular body, said cutting point dividing said cutting edge into a radially inner cutting edge portion and a radially outer cutting edge portion, and said trailing face of said gullet being smoothly and continuously connected to a trailing face of said flute;
   wherein a cutting zone that includes said cutting edge of said inner cutting tooth portion has a radial width that is not longer than a radial width of a cutting zone that includes said cutting edge of said outer cutting tooth portion;
   wherein said cutting points of said inner and outer cutting tooth portions are located radially outward from centers of the widths of respective said cutting zones; and
   wherein each said radially inner cutting edge portion is longer than the respective said radially outer cutting edge portion.

2. An annular hole cutter according to claim 1, wherein said annular hole cutter is integrally formed.

3. An annular hole cutter according to claim 1, wherein said flute has a depth that is less than a half of the thickness of said main tubular body.

4. An annular hole cutter according to claim 1, wherein said inner and outer cutting tooth portions each further comprise a crest that extends upward and rearward from said cutting points in the direction of rotation of said main tubular body.

5. An annular hole cutter according to claim 1, wherein at least said cutting point of said inner cutting tooth portion is disposed on a plane that is perpendicular to said axis of said main tubular body.

6. An annular hole cutter according to claim 1, wherein said cutting points of said inner and outer cutting tooth portions are disposed on planes that are perpendicular to said axis of said main tubular body.

7. An annular hole cutter according to claim 1, wherein said main tubular body further has lands formed between said flutes and disposed around the outer periphery of said main tubular body, and projections protruding radially outwardly from said lands, each projection having a width that is less than that of each of said lands.

8. An annular hole cutter according to claim 1, wherein the number of said cutting tooth groups is at least two.

* * * * *